(12) United States Patent
Rabii et al.

(10) Patent No.: US 9,939,869 B2
(45) Date of Patent: Apr. 10, 2018

(54) METHODS AND SYSTEMS FOR COORDINATION OF OPERATING STATES AMONGST MULTIPLE SOCS WITHIN A COMPUTING DEVICE

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Venu Gopal Rao Mullu, San Diego, CA (US); Venkata Kiran Kumar Matturi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/657,107

(22) Filed: Mar. 13, 2015

(65) Prior Publication Data
US 2016/0266633 A1  Sep. 15, 2016

(51) Int. Cl.
*G06F 1/32* (2006.01)

(52) U.S. Cl.
CPC .............. *G06F 1/3203* (2013.01); *G06F 1/325* (2013.01); *G06F 1/3206* (2013.01); *G06F 1/3287* (2013.01); *G06F 1/3296* (2013.01); *Y02B 60/1282* (2013.01)

(58) Field of Classification Search
None
See application file for complete search history.

(56) References Cited

U.S. PATENT DOCUMENTS

| 7,095,752 B2 | 8/2006 | Apostol et al. |
| 7,689,839 B2 | 3/2010 | Uguen et al. |
| 8,286,014 B2 | 10/2012 | Han et al. |
| 2004/0032605 A1* | 2/2004 | Regimbal .......... H04N 1/00087 358/1.13 |
| 2011/0161683 A1 | 6/2011 | Zou et al. |

(Continued)

OTHER PUBLICATIONS

Simunic T., et al., "Managing Power Consumption in Networks on Chips," IEEE Transactions on Very Large Scale Integration (VLSI) Systems, Jan. 2004, vol. 12 (1), pp. 96-107.

(Continued)

*Primary Examiner* — Paul Yanchus, III
(74) *Attorney, Agent, or Firm* — The Marbury Law Group/Qualcomm

(57) ABSTRACT

The various aspects provide methods, systems, and devices for coordinating the operating states of multiple SOCs within a computing device. Such coordination may be implemented through communication of information by the SOCs that represent advance notice of impending interactions between each other. The communicated information may be used by a recipient SOC for setting its operating state in advance of the potential impending interaction with another SOC. Accordingly, this technical improvement enables individual SOCs to preemptively influence the operating states of the other SOCs. For example, in the context of power management, the various aspects may coordinate the power states of multiple SOCs, thereby effectively implementing a monolithic power management state machine that improves overall power consumption of the computing device.

24 Claims, 6 Drawing Sheets

(56) References Cited

U.S. PATENT DOCUMENTS

| | | | |
|---|---|---|---|
| 2011/0239015 A1 | 9/2011 | Boyd et al. | |
| 2011/0264934 A1* | 10/2011 | Branover | G06F 1/3203 713/320 |
| 2014/0068297 A1* | 3/2014 | An | G06F 1/3203 713/320 |
| 2016/0091959 A1* | 3/2016 | Barak | G06F 1/3293 713/320 |
| 2016/0154452 A1* | 6/2016 | Hansson | G06F 1/3287 713/323 |

OTHER PUBLICATIONS

International Search Report and Written Opinion—PCT/US2016/016279—ISA/EPO—May 10, 2016.

\* cited by examiner

METHODS AND SYSTEMS FOR COORDINATION OF OPERATING STATES AMONGST MULTIPLE SOCS WITHIN A COMPUTING DEVICE

BACKGROUND

Wireless communication technologies and mobile electronic devices (e.g., cellular phones, tablets, laptops, etc.) have grown in popularity and use. To keep pace with increased consumer demands, mobile devices have become more feature-rich, and now commonly include multiple system-on-chips (SOCs) and other resources that allow mobile device users to execute complex and power intensive software applications (e.g., video and audio streaming and/or processing applications, network gaming applications, etc.) on mobile devices. Due to these and other improvements, smart phones and tablet computers have grown in popularity, and are replacing laptops and desktop machines as the platform of choice for many users. However, mobile devices often include a relatively limited power supply.

SUMMARY

Various embodiments provide methods, devices, and non-transitory process-readable storage media for coordinating operating states of a plurality of systems-on-chips (SOC) within a computing device. An embodiment method may include communicating, by a first SOC, information representing an advance notice of a potential impending interaction between the first SOC and a second SOC, receiving, by the second SOC, the information representing the advance notice of the potential impending interaction, and executing, by the second SOC, an operating state of the second SOC based on the received information.

In some embodiments, executing an operating state of the second SOC based on the received information may include executing, by a power manager executing on the second SOC, a power state of the second SOC based on the received information. In some embodiments, communicating the information representing the advance notice of the potential impending interaction between the first SOC and the second SOC may include setting, by the first SOC, a value representing an operating state of the first SOC in a memory register of the second SOC, and executing the power state of the second SOC based on the received information may include determining, by the power manager executing the second SOC, the power state of the second SOC based on the value in the memory register of the second SOC. In some embodiments, communicating the information representing the advance notice of the potential impending interaction between the first SOC and the second SOC may include sending, by the first SOC, a message to the power manager of the second SOC, the message containing a command relating to execution of one of plural power states, and executing the power state of the second SOC based on the received information may include determining, by the power manager of the second SOC, the power state of the second SOC based on the command sent in the message to the power manager.

Further embodiments include a computing device (or mobile computing device) configured with processor-executable instructions for performing operations of the methods described above. Further embodiments include a non-transitory processor-readable medium on which is stored processor-executable instructions configured to cause a computing device to perform operations of the methods described above.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention, and not to limit the disclosed aspects.

DETAILED DESCRIPTION

Figure 1A:
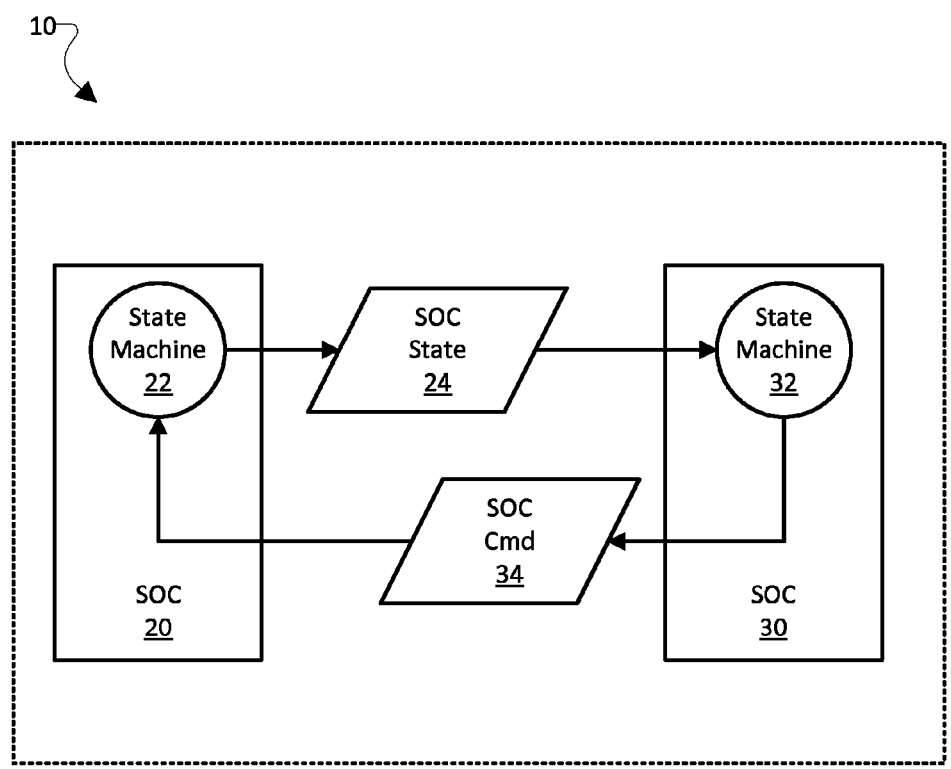
FIG. 1A is conceptual system block diagram illustrating SOCs of a computing device coordinating their operating states according to various aspects.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The word "exemplary" is used herein to mean "serving as an example, instance, or illustration." Any implementation described herein as "exemplary" is not necessarily to be construed as preferred or advantageous over other implementations.

The terms "mobile device," and "computing device" are used interchangeably herein to refer to any one or all of cellular telephones, smart phones, personal or mobile multi-media players, personal data assistants (PDAs), laptop computers, tablet computers, smart books, palmtop computers, wireless electronic mail receivers, multimedia Internet enabled cellular telephones, wireless gaming controllers, and similar electronic devices that include a programmable processor and a memory. While the various aspects are particularly useful in mobile devices, such as cellular telephones and other portable computing platforms, which may have relatively limited processing power and/or power storage capacity, the aspects are generally useful in any computing device that allocates threads, processes, or other sequences of instructions to a processing device or processing core.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory processor-readable media having various instructions and/or data structures stored thereon. Components may communicate by way of local and/or remote processes, function or procedure calls, electronic signals, data packets, memory read/writes, and other known computer, processor, and/or process related communication methodologies.

Power consumption in today's mobile devices is not scalable. One of the reasons for such power inefficiency stems from the current implementation of power management within isolated SOCs employed on modern mobile devices (e.g., WIFI, GPS, Bluetooth, Mobile Wireless, Multimedia, etc.). Specifically, each SOC operates independently from other SOCs and, thus is not aware of the power and operating states of other SOCs. So isolated, each SOC makes decisions regarding entry into low-power modes (e.g., sleep, doze, etc.) based solely on states of resources and within the SOC. Thus, power consumption on an SOC-based computing device (e.g., a modern smart phone) is managed by the multiple, autonomous power management processes that implement algorithms or state machines for respective SOCs within the device.

This current methodology for power management is inefficient because each of the respective power management processes has no way of accessing useful information regarding the operating states of other SOCs to use as input in its power management decisions. There is no way for an SOC to be notified whether its resources will be needed in advance of an impending event or interaction originating from another SOC. Thus, a power management process executing on an SOC may decide to enter a sleep state based on the SOC's own state information even though another SOC is about to send data to the SOC for processing. The result is that the SOC must exit the sleep state after a very brief period. This can be inefficient because it takes time (latency) and power to recover from a low-power state.

To avoid such problems, traditional power management processes implemented within an SOC are typically designed using conservative power management algorithms or state machines that require a lengthy duration of inactivity of the SOC's own resources before transitioning to a sleep state. With intermittent workloads, such delay prior to the sleep state results in considerable power inefficiency in the standby and idle states when compared to what could be achieved if sleep decisions could be informed when there is a likelihood that the SOC's resources may be tasked or provided data in the near future.

The various aspects provide methods, systems, and devices for coordinating the operating states of multiple SOCs within a computing device so that an SOC can be informed in advance of when the SOC's own resources may be needed by another SOC. Such coordination may be implemented through communication of information by the SOCs that represent advance notice of impending interactions between each other. The communicated information may be used by a recipient SOC for setting its operating state in advance of the potential impending interaction with another SOC. This technical improvement enables individual SOCs to preemptively influence the operating states of the other SOCs. For example, in the context of power management, the various aspects may coordinate the power states of multiple SOCs, thereby effectively implementing a monolithic power management state machine that improves overall power consumption of the computing device.

Figure 1B:
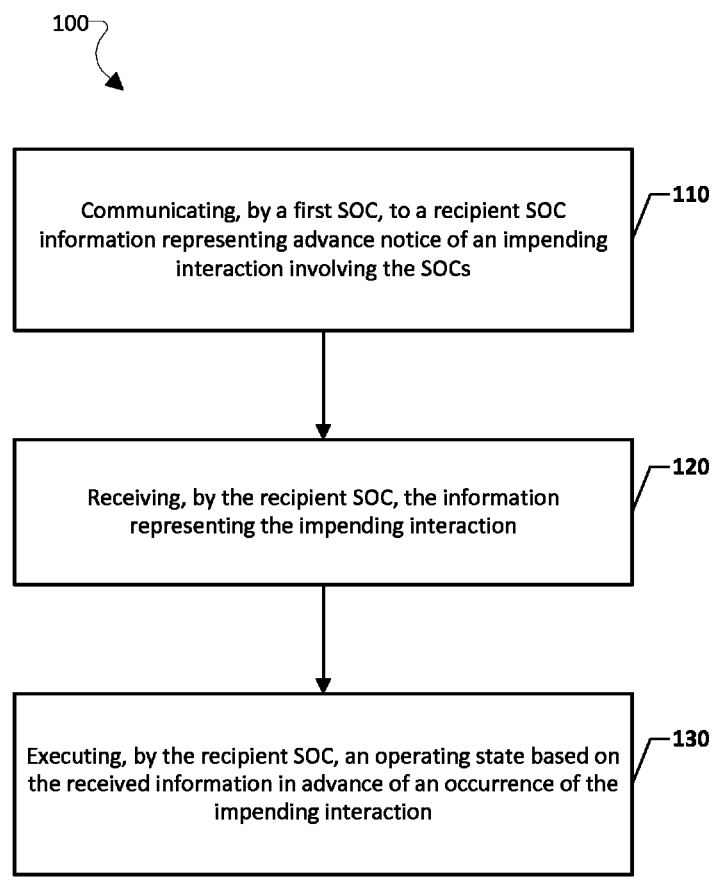
FIG. 1B is a process flow diagram of a method of coordinating the operating states of the SOCs within the computing device of FIG. 1A according to various embodiments.

FIG. 1A is conceptual system block diagram illustrating SOCs of a computing device coordinating their operating states according to various aspects. As shown, the computing device 10 may include at least two SOCs 20, 30 coupled to each other via an external bus or other interconnect (not illustrated). FIG. 1B is a process flow diagram 100 of a method of coordinating the operating states of the SOCs within the computing device of FIG. 1A according to various embodiments. For example, in block 110, a first SOC may communicate information to a recipient SOC, where the information represents advance notice of an impending interaction involving the SOCs. In block 120, the recipient SOC receives the communicated information representing the potential impending interaction. As shown in FIG. 1A, each SOC 20, 30 may serve as the communicator or recipient of the information. In block 130, the recipient SOC may execute an operating state based on the received information in advance of the potential impending interaction actually occurring. Communication of such information by an SOC may occur whenever the SOC determines that an impending interaction may occur as a result of its current operating state. Alternatively, communication of such information may occur whenever an SOC transitions to another operating state.

In some embodiments, the communicated information may be a flag or value representing the operating state 24 of the SOC. For example, the operating state 24 may be indicative of an impending interaction that may require access to resource(s) of the recipient SOC. The communicated information may also be a command 34 from the SOC that requests execution (or non-execution) of a particular operating state by the recipient SOC in advance of an impending interaction. For example, as shown in FIG. 1A, state machines 22, 32 of SOCs 20, 30 may exchange operating state and/or commands in order to effectively influence each other's respective operating states in advance of impending interactions between them. It is not necessary that a subsequent interaction actually occur, and thus is referred to as a potential impending interaction. For example, a modem SOC may send a message to or set a state value in the memory of an applications processor SOC that it is receiving an incoming signal before determining whether the incoming signal is data that should be passed to the applications processor SOC. In this example, the incoming signal may turn out to be a status message that does not need to be passed to the applications processor SOC, and thus no interaction may follow the message or state value set in the applications processor SOC. Thus, the information representing the potential impending interaction may be communicated to a recipient SOC so that it can be ready in the event that such an interaction occurs.

Communication of the information representing an SOC operating state or a command may involve a process executing on one SOC writing data, such as a flag or other value, directly to a control register or other memory element of another SOC. A process executing on the other SOC, such as a power management process, may check the control register or other memory element for the data either periodically or as part of an algorithm or state machine for coordinating the SOC's operating state with the operating states of other SOCs. Communication of such information may also involve one SOC sending a message through an application programming interface (API) to a processor that implements the API within the other SOC. The message may include the information representing an operating state of the SOC or a command as formatted data within the payload of the message.

Figure 2:
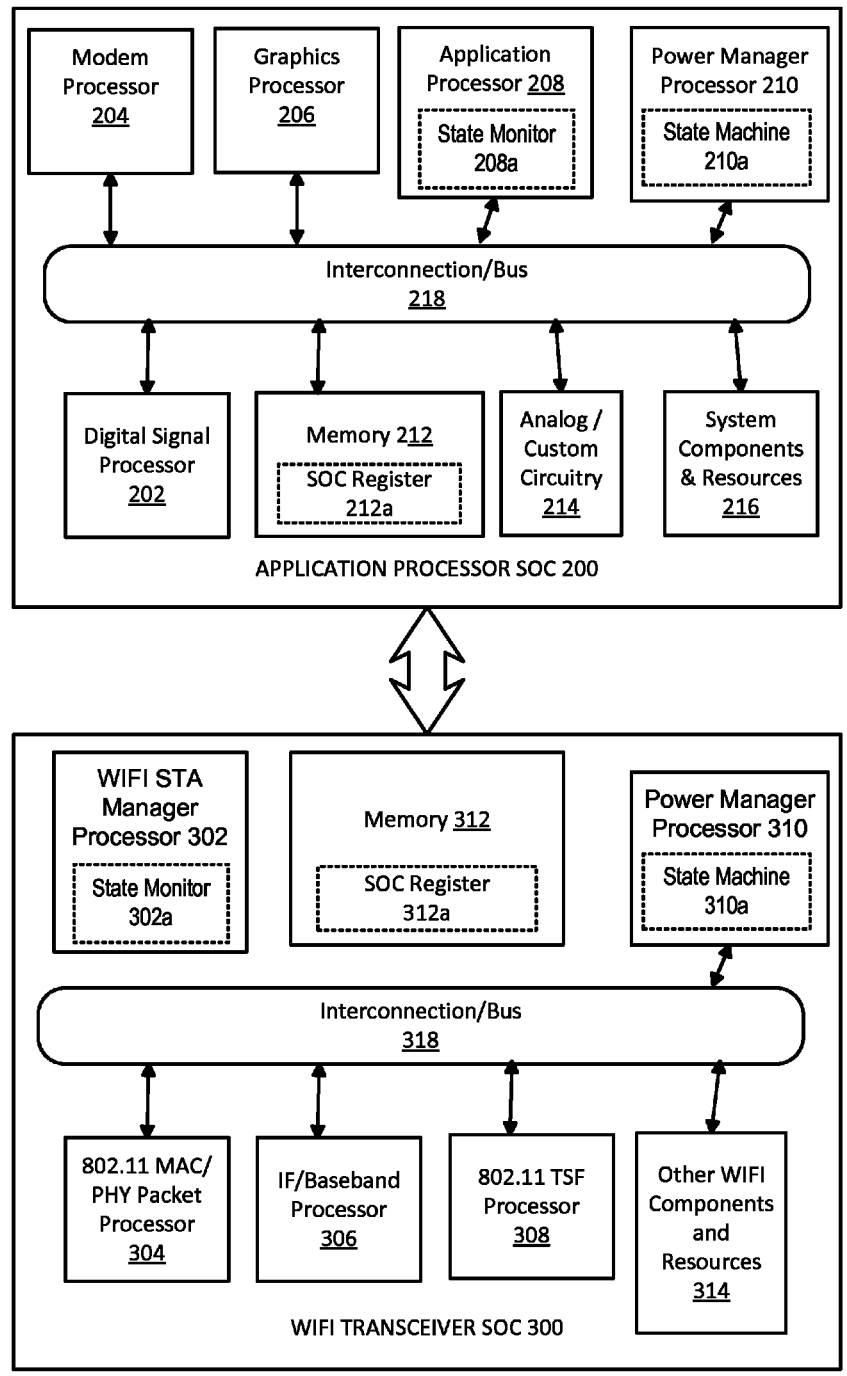
FIG. 2 is a block diagram of a system-on-a-chip (SOC) architecture that may be used in computing devices according to various embodiments.

FIG. 2 is a block diagram of a system-on-a-chip (SOC) architecture that may be used in computing devices according to various embodiments. In this example, an application processor SOC 200 and a WIFI transceiver SOC 300 may exchange operating state and/or power commands in order to effectively influence each other's respective power states in advance of impending interactions between them.

The application processor SOC 200 may include a number of heterogeneous processors, such as a digital signal processor (DSP) 202, a modem processor 204, a graphics processor 206, an application processor 208, and power manager processor 210. The application processor SOC 200 may also include analog circuitry and custom circuitry 214 and other system components and resources 216 used to support the processors and software programs running on a computing device. The processors 202, 204, 206, 208, 210 may communicate with each other, as well as with one or more memory elements 212, system components and resources 216, and circuitry 214, via an interconnection/bus module 218, which may include an array of reconfigurable logic gates and/or implement a bus architecture (e.g., CoreConnect, AMBA, etc.).

The WIFI transceiver SOC 300 may also include a number of heterogeneous processors, such as a WIFI Station (STA) Manager processor 302, an 802.11 Media Access Control/Physical Layer (MAC/PHY) packet processor 304, an intermediate frequency (IF)/baseband processor 306, an 802.11 Timing Synchronization Framework (TSF) processor 308, and a Power Manager Processor 310. The WIFI transceiver SOC 300 may also include other WIFI components and resources 314 used to support the WIFI data transmission and reception. The WIFI processors 302, 304, 306, 308, 310 may communicate with each other, as well as with one or more memory elements 312, and other WIFI components and resources 314, via an interconnection/bus module 318, which may include an array of reconfigurable logic gates and/or implement a bus architecture.

In the context of power management, the application processor SOC 200 and the WIFI transceiver SOC 300 may be configured to effectively implement a monolithic power management state machine through synchronized, communication of operating state information or power commands amongst the individual power management processes, such state machines 210a, 310a, that traditionally do not share information. The communicated state information or power commands may be used by the recipient SOC's power management process to determine whether or when to transition to a sleep state or other reduced power state (e.g., DOZE, SLEEP, DEEP SLEEP, etc.). In this manner, each of the individual SOCs may preemptively influence the power management of the other SOCs to create a platform-based power management scheme.

In this example, such monolithic power management may be implemented by the WIFI transceiver SOC 300 setting an operating state flag or identifier in the application processor SOC 200, where the operating state flag is a value indicative of an impending event or interaction that may require access to one or more processors and/or resources of the application processor SOC 200. As shown in FIG. 2, the application processor SOC 200 may include a memory element 212 having a register 212a in which the WIFI transceiver SOC 300 may write its operating state flag. The application processor SOC 200 may then use this information as part of the power management state machine 210a executed by the power manager processor 210 for determining whether to transition to a sleep state or not. Such communication by the WIFI transceiver SOC 300 may occur (e.g., the state flag is set) at the start of certain data processing performed by one or more of the constituent WIFI processors that may (or may not) result in data being sent to the application processor SOC 200. Put another way, the application processor SOC 200 is notified in advance that data may be forthcoming from the WIFI transceiver SOC 300, which enables the processors and resources of the application processor SOC 200 to be ready to handle the incoming data, if and when, such data actually arrives.

For example, in response to one of the constituent processors of the WIFI transceiver SOC 300 determining or detecting an incoming data transmission is about to be received (e.g., upon receipt of preamble data of a WIFI transmission), the power management state machine 310a executing within the power manager processor 310 may transmit a message containing a "NO_SLEEP" command to, or set a flag in an SOC register 212a of, the application processor SOC 200 that will process the incoming data transmission once the data is subsequently received. Likewise, in response to one of the constituent processors of the application processor SOC 200 determining or detecting that data is being processed that may need to be sent over a WIFI link, the power management state machine 210a executing on the power manager processor 210 of the application processor SOC 200 may issue a message to, or set a flag in an SOC register 312a of, the WIFI transceiver SOC 300 that handles WIFI data transmissions. Such communication enables the power management state machine 310a of the WIFI transceiver SOC 300 to consider such useful information when determining whether to transition to a sleep state or not, and thus delay (or expedite) transition to a sleep state.

The message sent to or flag set in an SOC according to various embodiments differs from normal data transmission and interrupts by which SOCs communicate with each other. For example, the message/flag set occurs as soon as an SOC enters an operating state that has the potential to involve another SOC and thus a number of microseconds before the data is actually transmitted. This timing may be important to alert the recipient SOC from entering a sleep state right before the recipient SOC will need to process data. Ordinarily, SOCs are notified of incoming data at the time the data is actually placed on its external interface bus via interrupt, resulting in "wake up" latencies if the recipient SOC is in a sleep state. Also, such a message/flag does not indicate that the data is available for processing, and a data transmission may not occur, such as when the payload of a received WIFI packet does not have to be provided to the application processor SOC.

In order to enable efficient power management, some embodiments may also include one SOC clearing a state flag that was set in other recipient SOCs, or setting a different flag in other recipient SOCs, when the operating state no longer exists (e.g., when the wireless modem processor 204 is not processing incoming packets). When the flag is cleared in the recipient SOCs, a power management process executing in a recipient SOC can determine whether to enter a sleep state based solely on conditions within the SOC. The power management process of the recipient SOC can make this determination without an added conservatism delay that compensates for the potential receipt of data sent from another SOC for further processing. Thus, by exchanging information regarding operating states or issuance of specific commands in advance of impending interactions or events amongst SOCs in a computing device and clearing such information when such states no longer exist, the power management processes collectively executing on SOCs within a device may use less conservative criteria for entering sleep states, thereby enabling greater power savings without impacting performance due to power-up latency.

In some embodiments, communication of operating states or commands indicative of impending interactions by one SOC to another may be performed by a process that is separate from the state machine that uses operating states or commands from other SOCs to determine and execute its power states or other operating states. For example, the application processor SOC 200 may include a state monitor 208a executing on the application processor 208. The state monitor 208a may be configured to maintain or access information regarding the various operating states of the SOC processors 202, 204, 206, 208, 210. The state monitor 208a may be further configured to communicate information representing such operating states to some or all of the other external SOCs whenever a state change is detected or only when a state change is detected that may result in an impending interaction with another SOC. Likewise, the WIFI transceiver SOC 300 may include a state monitor 302a executing on the WIFI station manager 302 configured to maintain or access information regarding the various operating states of the WIFI processors 302, 304, 306, 308, and 310. Each of the state monitors 208a, 302a may be implemented as a process implemented at the application layer, kernel layer, or other operating system layer implemented by a processor within a respective SOC.

Figure 3:
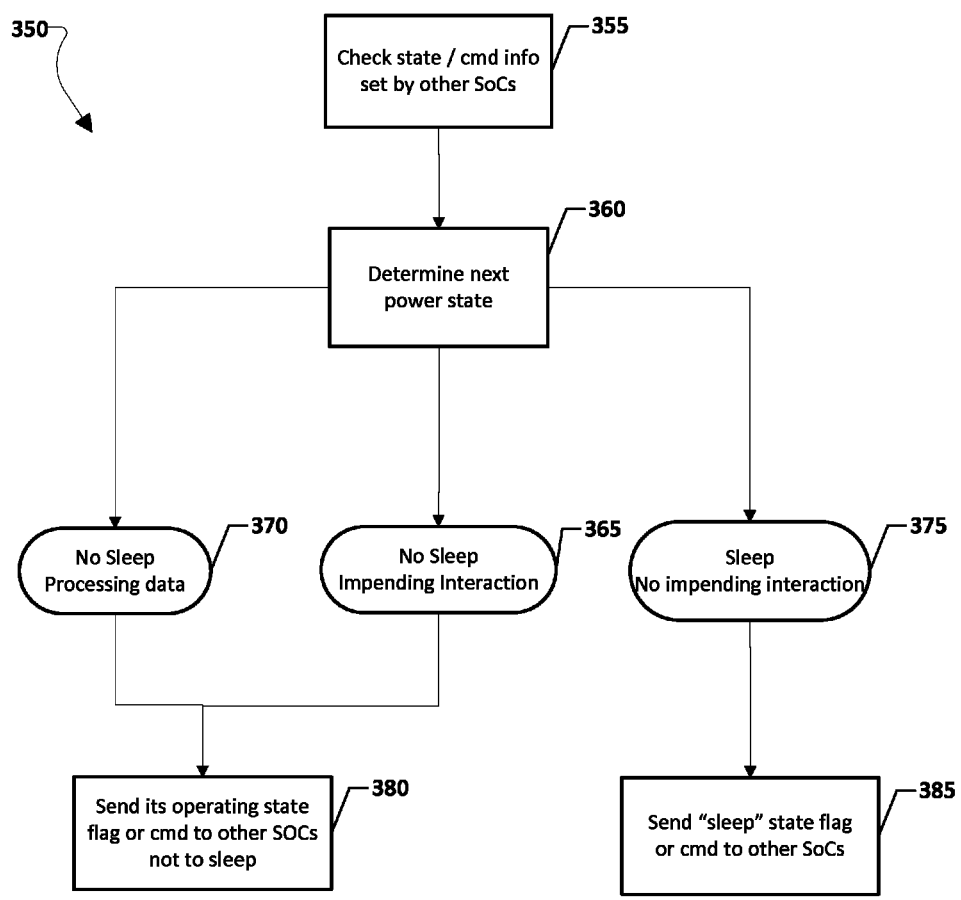
FIG. 3 is an exemplary state diagram that may be implemented by a power management state machine executing within an SOC according to various embodiments.

FIG. 3 is an exemplary state diagram 350 that may be implemented by a power management state machine of an SOC according to various embodiments. In this example, the power management state machine executing within an SOC communicates operating state or commands representing impending interactions to other SOCs and uses similar information from other SOCs for determining the SOC's own power state.

In block 355, the power management state machine may check for operating state or command information that is set in a control register within the SOC by, or received in a message from, other SOCs. In block 360, the power management state machine may decide a next power state for the SOC based, in part, on the operating state or command information representing an impending interaction with another SOC. For example, in response to the power management state machine determining that information received from another SOC represents advance notice of an impending interaction with that SOC, the power management state machine may decide to delay entry of the SOC into a sleep state as the next power state 365.

In response to the power management state machine determining that no information is received that is indicative of an impending interaction with another SOC, the SOC's power management state machine may determine whether to enter a sleep state based solely on conditions within the SOC. For example, in response to determining that the SOC is executing in an active operating state, e.g., processing data, the SOC's power management state machine may decide to delay entry of the SOC into a sleep state as the next power state 370. Conversely, in response to determining that the SOC is not executing in an active operating state, e.g., not processing data, the SOC's power management state machine may decide to transition the SOC into a sleep state as the next power state 375. The SOC's power management state machine may also decide to transition the SOC into a sleep state as the next power state 375 in the event the SOC receives a command from another SOC expressly authorizing the SOC to enter a sleep state.

In blocks 380 and 385, the SOC's power management state machine may communicate its operating state information or commands to one or more other SOCs within the computing device. In this way, the SOC's power management state machine may preemptively influence the power states of other SOCs in a manner similar to which the SOC's power states are influenced by operating state or command information received from other SOCs. For example, when the power management state machine determines that the SOC is either in an active operating state in which data is being processed in state 370 or the SOC is awaiting an impending interaction with another SOC at which time the SOC is expected to be in an active operating state in state 365, the power management state machine may communicate its active operating state or a command to other SOCs in block 380. The information communicated to the other SOC's may indicate an impending—or the potential for an—interaction with such other SOCs and/or be an indication that the SOC should not enter a sleep state. Conversely, when the SOC's power management state machine determines that the SOC is in a sleep state or is about to enter a sleep state, the SOC's power management state machine may communicate the SOC's sleep state or a command to other SOCs in block 385, with the communication indicating that there are no impending interactions and/or authorizing such other SOCs to enter into a sleep state.

Figure 4:
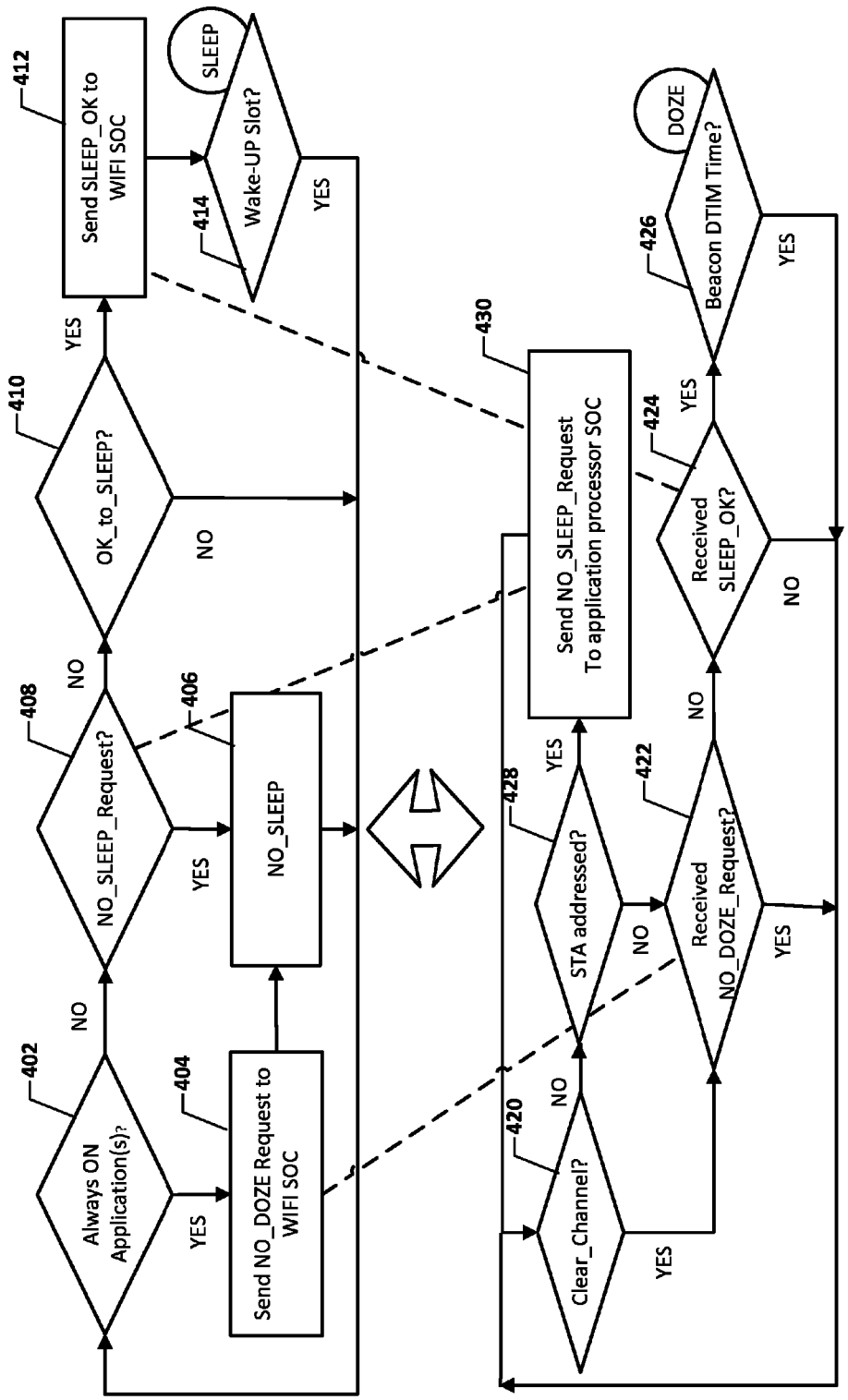
FIG. 4 is a process flow diagram of a method implemented in a monolithic power management state machine implemented by individual power management state machines of an application processor SOC and a WIFI transceiver SOC according to an embodiment.

FIG. 4 is a process flow diagram of a method implemented in a monolithic power management state machine implemented by individual power management state machines of an application processor SOC and a WIFI transceiver SOC according to an embodiment. The process flow diagram illustrates ways in which the respective power management state machines 210a, 310a of the application processor SOC 200 and the WIFI transceiver SOC 300, as illustrated in FIG. 2, may preemptively influence each other's power management schemes.

As shown, the power management state machine 210a executing within the application processor SOC 200 ("Application state machine 210a") may prevent the WIFI transceiver SOC 300 from transitioning into a reduced power state, e.g., "DOZE," by communicating a "NO DOZE" request command in block 404 to the power management state machine 310a ("WIFI state machine 310a").

For example, in determination block 402, the Application state machine 210a determines whether there are one or more applications executing on the application processor SOC 200 that requires an active "always on" operating state.

This information may be obtained through an interprocess communication within the SOC 200 between the power manager processor 210 and the application processor 208, for example. In response to determining that there is at least one "always on" application (i.e., determination block 402="YES"), the Application state machine 210*a* communicates a "NO DOZE" request command to the WIFI transceiver SOC 300 in block 404 and causes the application processor SOC 200 to enter into a non-sleep state in block 406. As discussed above, the command may be set as a flag or other value within a control register in memory of the WIFI transceiver SOC 300 or sent within a message through an application programming interface implemented by a processor (e.g., power manager processor 310) within the WIFI transceiver SOC 300.

Turning to the process flow of the WIFI state machine 310*a*, communication of the "NO DOZE" power request command may prevent the WIFI transceiver SOC 300 from transitioning to a "DOZE" power state even when there is no incoming/outgoing data over the WIFI channel. For example, in determination block 420, the WIFI state machine 310*a* may check carrier sense on the WIFI channel to determine whether there is any incoming data. This information may be obtained through an interprocess communication within the SOC 300 between the power manager 310 and the WIFI station manager 302, for example. In response to determining that the WIFI channel is clear (determination block 420="YES"), the WIFI state machine 310*a* may attempt to transition into the "DOZE" state through determination blocks 422 and 424. For example, in determination block 422, the WIFI state machine 310*a* checks a control register, for example, to determine whether a "NO DOZE" request command is received from the Application state machine 210*a*. In response to determining that a "NO DOZE" power request command is received (i.e., determination block 422="YES"), the WIFI state machine 310*a* prevents a transition of the WIFI transceiver SOC 300 to the DOZE state. As a result, the Application state machine 210*a* ensures that WIFI transceiver SOC 300 is ready to handle any WIFI transmission originating from an "always on" application without any "wake up" delays or latencies.

Conversely, the Application state machine power may facilitate entry of the WIFI transceiver SOC 300 into a reduced power state quicker by communicating a "SLEEP_OK" request command in block 412 to the WIFI state machine 310*a*.

For example, referring back to determination block 402, in response to the Application state machine 210*a* determining that there is no "always on" application executing on the application processor SOC 200, the "NO DOZE" power request command is not sent (i.e., determination block 402="NO"). Instead, the Application state machine 210*a* may decide to transition the application processor SOC 200 to a sleep state in determination block 410. This decision may be implemented by factors relating to the operating states of the various internal processors and components of the application processor SOC 200. In response to determining to transition the application processor SOC 200 to a sleep state (i.e., determination block 410="YES"), the Application state machine 210*a* may also communicate a "SLEEP_OK" request command to the WIFI transceiver SOC 300 in block 412 before entering the sleep state. Block 414 represents standard processing in which the application processor SOC 200 transitions in and out of the sleep state ("wake-up") to listen for data processing requests.

Turning to the process flow of the WIFI state machine 310*a*, communication of the "SLEEP_OK" power request command may enable the WIFI transceiver SOC 300 to transition to a sleep state quicker. For example, in response to determining that there is no carrier sense on the WIFI channel in determination block 420 (i.e., determination block 420="NO"), the WIFI state machine 310*a* may attempt to transition into the sleep state, such as "DOZE." Specifically, in response to determining that a "NO DOZE" request command is not sent (i.e., determination block 422="NO"), the WIFI state machine 310*a* proceeds to determination block 424 to determine whether a "SLEEP_OK" request command is received from the Application state machine 210*a*. Where, in this example, the "SLEEP_OK" command is received (i.e., determination block 424="YES"), the WIFI state machine 310*a* may decide, to enter the "DOZE" state sooner than typical sleep state transitions. Block 426 represents standard WIFI processing in which the WIFI transceiver SOC 300 periodically "wakes up" to listen for Delivery Traffic Indication Map (DTIM) messages from other WIFI devices (e.g., access point) indicating the presence of data about be transmitted.

The process flows described above illustrate how an application processor SOC 200 may influence the power states of a WIFI transceiver SOC 300. The process flow described below illustrates how the WIFI transceiver SOC may, in turn, influence the power state of the application processor SOC.

As shown, the WIFI state machine 310*a* may prevent the Application processor SOC 200 from transitioning into a reduced power state, e.g., "SLEEP," by communicating a "NO SLEEP" request command in block 430 to the Application state machine 210*a*. For example, in block 420, the WIFI state machine 310*a* may check carrier sense on the WIFI channel to determine whether there is any incoming data. In response to determining that the WIFI channel is not clear, e.g., an indication that incoming data may soon follow (i.e., determination block 420="NO"), the WIFI state machine proceeds to determination block 428. In determination block 428, the WIFI state machine determines whether incoming data is received containing a station (STA) address of the WIFI transceiver SOC 300. The information relating to the station address may be obtained through interprocess communication between the power manager 310 and the WIFI station (STA) manager processor 302, for example. The receipt of a station (STA) address may be a further indication that the incoming WIFI transmission may include data requiring further processing by one or more processors/components of the application processor SOC 200. In response to determining that a station (STA) address is received (i.e., determination block 420="YES"), the WIFI state machine 310*a* may communication a "NO_SLEEP" request command to the application processor SOC 200 in block 430, so that its processor and components are ready in advance to handle any incoming WIFI data transmission. For example, in response to determining that the Application power state machine 210*a* detects that the NO_SLEEP command request is received in block 408, the application processor SOC 200 will not be allowed to enter into any sleep state until, for example, a SLEEP_OK power command request is subsequently received from the WIFI transceiver SOC.

Figure 5:
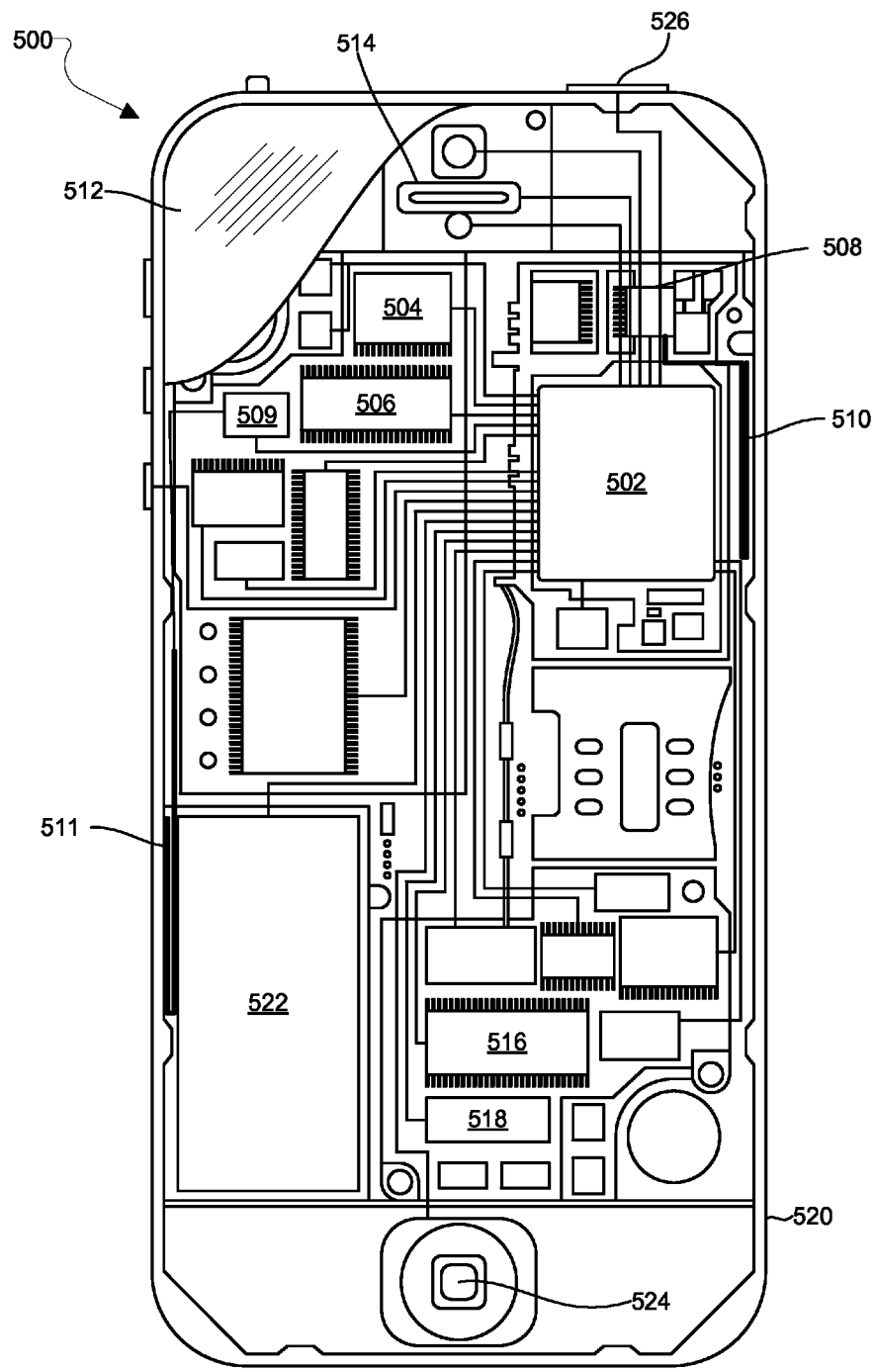
FIG. 5 is a component block diagram of a computing device suitable for implementing various embodiments.

Various embodiments (including, but not limited to, embodiments discussed above with reference to FIGS. 1-4) may be implemented in any of a variety of computing devices, an example of which (e.g., mobile communication device 600) is illustrated in FIG. 5. The computing device 500 may include a processor 502 coupled to a touchscreen controller 504 and an internal memory 506. The processor 502 may be one or more multi-core integrated circuits designated for general or specific processing tasks. The internal memory 506 may be volatile or non-volatile memory, and may also be secure and/or encrypted memory, or unsecure and/or unencrypted memory, or any combination thereof. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the computing device 500 need not have touch screen capability.

The computing device 500 may have a cellular network transceiver 508 coupled to the processor 502 and to an antenna 510 and configured for sending and receiving cellular communications. The transceiver 508 and the antenna 510 may be used with the above-mentioned circuitry to implement the various embodiment methods. The computing device 500 may include a SIM card 513 coupled to the transceiver 508 and/or the processor 502 and configured as described above. The computing device 500 may include a cellular network wireless modem chip 517 that enables communication via a cellular network and is coupled to the processor 502.

The computing device 500 may also include speakers 514 for providing audio outputs. The computing device 500 may also include a housing 520, constructed of a plastic, metal, or a combination of materials, for containing all or some of the components discussed herein. The computing device 500 may include a power source 522 coupled to the processor 502, such as a disposable or rechargeable battery. The rechargeable battery may also be coupled to the peripheral device connection port to receive a charging current from a source external to the computing device 500. The computing device 500 may also include a physical button 524 for receiving user inputs. The computing device 500 may also include a power button 526 for turning the computing device 500 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, will modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of coordinating operating states of a plurality of systems-on-chips (SOC) within a computing device, comprising:
    determining, by a first SOC, whether an operating state of the first SOC is indicative of data processing that is capable of causing a potential impending interaction between the first SOC and a second SOC;

communicating, by the first SOC, information representing an advance notice of the potential impending interaction between the first SOC and the second SOC in response to determining that the operating state of the first SOC is indicative of data processing that is capable of causing the potential impending interaction between the first SOC and the second SOC;

communicating, by the first SOC, information authorizing the second SOC to enter into a sleep state in response to determining that the operating state of the first SOC is not indicative of data processing that is capable of causing a potential impending interaction between the first SOC and the second SOC;

receiving, by the second SOC, one of the information representing the advance notice of the potential impending interaction and the information authorizing the second SOC to enter into the sleep state from the first SOC;

executing, by the second SOC, an operating state of the second SOC based on the received information; and communicating, by the second SOC, a request preventing the first SOC from transitioning into a reduced power state in response to determining that data received at the second SOC requires further processing by the first SOC.

2. The method of claim 1, wherein executing an operating state of the second SOC based on the received information comprises executing, by a power manager executing on the second SOC, a power state of the second SOC based on the received information.

3. The method of claim 2, wherein:
communicating the information representing the advance notice of the potential impending interaction between the first SOC and the second SOC comprises setting, by the first SOC, a value representing an operating state of the first SOC in a memory register of the second SOC; and
executing the power state of the second SOC based on the received information comprises determining, by the power manager executing the second SOC, the power state of the second SOC based on the value in the memory register of the second SOC.

4. The method of claim 2, wherein:
communicating the information representing the advance notice of the potential impending interaction between the first SOC and the second SOC comprises sending, by the first SOC, a message to the power manager of the second SOC, the message containing a command relating to execution of one of plural power states; and
executing the power state of the second SOC based on the received information comprises determining, by the power manager of the second SOC, the power state of the second SOC based on the command sent in the message to the power manager.

5. A computing device comprising a first system-on-a-chip ("first SOC") and a second system-on-a-chip ("second SOC"), each of the first SOC and the second SOC further comprising a processor configured with processor-executable instructions to perform operations for coordinating operating states of a plurality of SOCs within the computing device, the operations comprising:
determining, by the processor of the first SOC, whether an operating state of the first SOC is indicative of data processing that is capable of causing a potential impending interaction between the first SOC and the second SOC;

communicating information, by the processor of the first SOC, representing an advance notice of the potential impending interaction between the first SOC and the second SOC in response to determining that the operating state of the first SOC is indicative of data processing that is capable of causing the potential impending interaction between the first SOC and the second SOC;

communicating, by the processor of the first SOC, information authorizing the second SOC to enter into a sleep state in response to determining that the operating state of the first SOC is not indicative of data processing that is capable of causing a potential impending interaction between the first SOC and the second SOC;

receiving, by the processor of the second SOC, one of the information representing the advance notice of the potential impending interaction or the information authorizing the second SOC to enter into the sleep state from the first SOC;

executing, by the processor of the second SOC, an operating state of the second SOC based on the received information; and communicating, by the processor of the second SOC, a request preventing the first SOC from transitioning into a reduced power state in response to determining that data received at the second SOC requires further processing by the first SOC.

6. The computing device of claim 5, wherein the processor of the second SOC is configured with processor-executable instructions to perform operations such that executing an operating state of the second SOC based on the received information comprises executing a power state of the second SOC based on the received information.

7. The computing device of claim 6, wherein:
the processor of the first SOC is configured with processor-executable instructions to perform operations such that communicating the information representing the advance notice of the potential impending interaction between the first SOC and the second SOC comprises setting a value representing an operating state of the first SOC in a memory register of the second SOC; and
the processor of the second SOC is configured with processor-executable instructions to perform operations such that executing the power state of the second SOC based on the received information comprises determining the power state of the second SOC based on the value in the memory register of the second SOC.

8. The computing device of claim 6, wherein:
the processor of the first SOC is configured with processor-executable instructions to perform operations such that communicating the information representing the advance notice of the potential impending interaction between the first SOC and the second SOC comprises sending a message to the processor of the second SOC, the message containing a command relating to execution of one of plural power states; and
the processor of the second SOC is configured with processor-executable instructions to perform operations such that executing the power state of the second SOC based on the received information comprises determining the power state of the second SOC based on the command sent in the message to the processor of the second SOC.

9. A non-transitory processor-readable storage medium having stored thereon processor-executable instructions configured to cause a processor of a first system-on-a-chip ("first SOC") and a processor of a second system-on-a-chip ("second SOC") to perform operations for coordinating operating states of a plurality of SOCs within a computing device, the operations comprising:
  determining, by the processor of the first SOC, whether an operating state of the first SOC is indicative of data processing that is capable of causing a potential impending interaction between the first SOC and the second SOC;
  communicating, by the processor of the first SOC, information representing an advance notice of the potential impending interaction between the first SOC and the second SOC in response to determining that the operating state of the first SOC is indicative of data processing that is capable of causing the potential impending interaction between the first SOC and the second SOC;
  communicating, by the processor of the first SOC, information authorizing the second SOC to enter into a sleep state in response to determining that the operating state of the first SOC is not indicative of data processing that is capable of causing a potential impending interaction between the first SOC and the second SOC;
  receiving, by the processor of the second SOC, one of the information representing the advance notice of the potential impending interaction or the information authorizing the second SOC to enter into the sleep state from the first SOC;
  executing, by the processor of the second SOC, an operating state of the second SOC based on the received information; and
  communicating, by the processor of the second SOC, a request preventing the first SOC from transitioning into a reduced power state in response to determining that data received at the second SOC requires further processing by the first SOC.

10. The non-transitory processor-readable storage medium of claim 9, wherein the stored processor-executable instructions are configured to cause the processor of the second SOC of the computing device to perform operations such that executing an operating state of the second SOC based on the received information comprises executing a power state of the second SOC based on the received information.

11. The non-transitory processor-readable storage medium of claim 10, wherein:
  the stored processor-executable instructions are configured to cause the processor of the first SOC to perform operations such that communicating the information representing the advance notice of the potential impending interaction between the first SOC and the second SOC comprises setting a value representing an operating state of the first SOC in a memory register of the second SOC; and
  the stored processor-executable instructions are configured to cause the processor of the first SOC to perform operations such that executing the power state of the second SOC based on the received information comprises determining the power state of the second SOC based on the value in the memory register of the second SOC.

12. The non-transitory processor-readable storage medium of claim 10, wherein:
  the stored processor-executable instructions are configured to cause the processor of the first SOC to perform operations such that communicating the information representing the advance notice of the potential impending interaction between the first SOC and the second SOC comprises sending a message to the processor of the second SOC, the message containing a command relating to execution of one of plural power states; and
  the stored processor-executable instructions are configured to cause the processor of the second SOC to perform operations such that executing the power state of the second SOC based on the received information comprises determining the power state of the second SOC based on the command sent in the message to the processor of the second SOC.

13. A computing device configured to coordinate operating states of a plurality of system-on-chips (SOCs) within the computing device, comprising:
  means for determining in a first SOC whether an operating state of the first SOC is indicative of data processing that is capable of causing a potential impending interaction between the first SOC and a second SOC;
  means for communicating in the first SOC information representing an advance notice of the potential impending interaction between the first SOC and the second SOC in response to determining that the operating state of the first SOC is indicative of data processing that is capable of causing the potential impending interaction between the first SOC and the second SOC;
  means for communicating in the first SOC information authorizing the second SOC to enter into a sleep state in response to determining that the operating state of the first SOC is not indicative of data processing that is capable of causing a potential impending interaction between the first SOC and the second SOC;
  means for receiving in the second SOC one of the information representing the advance notice of the potential impending interaction or the information authorizing the second SOC to enter into the sleep state from the first SOC;
  means for executing in the second SOC an operating state of the second SOC based on the received information; and
  means for communicating a request preventing the first SOC from transitioning into a reduced power state in response to determining that data received at the second SOC requires further processing by the first SOC.

14. The computing device of claim 13, wherein the means for executing in a second SOC an operating state of the second SOC based on the received information comprises means for executing a power state of the second SOC based on the received information.

15. The computing device of claim 14, wherein:
  means for communicating in the first SOC the information representing the advance notice of the potential impending interaction between the first SOC and the second SOC comprises means for setting a value representing an operating state of the first SOC in a memory register of the second SOC; and
  means executing in the second SOC the power state of the second SOC based on the received information comprises means for determining the power state of the second SOC based on the value in the memory register of the second SOC.

16. The computing device of claim 14, wherein:
  means for communicating in the first SOC the information representing the advance notice of the potential impending interaction between the first SOC and the second SOC comprises means for sending a message to the second SOC, the message containing a command relating to execution of one of plural power states; and means for executing in the second SOC the power state of the second SOC based on the received information comprises means for determining the power state of the second SOC based on the command sent in the message to the processor of the second SOC.

17. The method of claim 1, wherein executing the operating state of the second SOC based on the received information comprises:
determining whether the received information from the first SOC is the information authorizing the second SOC to enter into the sleep state; and
executing the sleep state of the second SOC in response to receiving the information authorizing the second SOC to enter into the sleep state from the first SOC.

18. The computing device of claim 5, wherein the processor of the second SOC is configured with processor-executable instructions to perform operations such that executing the operating state of the second SOC based on the received information comprises:
determining, by the processor of the second SOC, whether the received information from the first SOC is the information authorizing the second SOC to enter into the sleep state; and
executing, by the processor of the second SOC, the sleep state of the second SOC in response to receiving the information authorizing the second SOC to enter into the sleep state from the first SOC.

19. The non-transitory processor-readable storage medium of claim 9, wherein the stored processor-executable instructions are configured to cause the processor of the second SOC of the computing device to perform operations such that executing the operating state of the second SOC based on the received information comprises:
determining whether the received information from the first SOC is the information authorizing the second SOC to enter into the sleep state; and
executing the sleep state of the second SOC in response to receiving the information authorizing the second SOC to enter into the sleep state from the first SOC.

20. The computing device of claim 13, wherein means for executing in the second SOC the operating state of the second SOC based on the received information comprises:
means for determining whether the received information from the SOC is the information authorizing the second SOC to enter into the sleep state; and
means for executing the sleep state of the second SOC in response to receiving the information authorizing the second SOC to enter into the sleep state from the first SOC.

21. The method of claim 1, wherein the information authorizing the second SOC to enter into the sleep state comprises information indicating that no potential impending interaction between the first SOC and the second SOC exists.

22. The computing device of claim 5, wherein the information authorizing the second SOC to enter into the sleep state comprises information indicating that no potential impending interaction between the first SOC and the second SOC exists.

23. The non-transitory processor-readable storage medium of claim 9, wherein the information authorizing the second SOC to enter into the sleep state comprises information indicating that no potential impending interaction between the first SOC and the second SOC exists.

24. The computing device of claim 13, wherein the information authorizing the second SOC to enter into the sleep state comprises information indicating that no potential impending interaction between the first SOC and the second SOC exists.

* * * * *